US010552191B2

(12) United States Patent
Chang et al.

(10) Patent No.: US 10,552,191 B2
(45) Date of Patent: Feb. 4, 2020

(54) DISTRIBUTED HYBRID CLOUD ORCHESTRATION MODEL

(71) Applicant: Cisco Technology, Inc., San Jose, CA (US)

(72) Inventors: David Wei-Shen Chang, Milpitas, CA (US); Abhijit Patra, Santa Clara, CA (US); Nagaraj A. Bagepalli, Fremont, CA (US); Dileep Kumar Devireddy, San Jose, CA (US); Murali Anantha, Sunnyvale, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 252 days.

(21) Appl. No.: 15/417,021

(22) Filed: Jan. 26, 2017

(65) Prior Publication Data

US 2018/0212896 A1    Jul. 26, 2018

(51) Int. Cl.
*G06F 15/173* (2006.01)
*G06F 9/455* (2018.01)

(52) U.S. Cl.
CPC .. *G06F 9/45558* (2013.01); *G06F 2009/4557* (2013.01)

(58) Field of Classification Search
USPC .......................................................... 709/226
See application file for complete search history.

(56) References Cited

U.S. PATENT DOCUMENTS

| | | |
|---|---|---|
| 5,812,773 A | 9/1998 | Norin |
| 5,889,896 A | 3/1999 | Meshinsky et al. |
| 6,108,782 A | 8/2000 | Fletcher et al. |
| 6,178,453 B1 | 1/2001 | Mattaway et al. |
| 6,298,153 B1 | 10/2001 | Oishi |
| 6,343,290 B1 | 1/2002 | Cossins et al. |
| 6,643,260 B1 | 11/2003 | Kloth et al. |

(Continued)

FOREIGN PATENT DOCUMENTS

| | | |
|---|---|---|
| CN | 101719930 | 6/2010 |
| CN | 101394360 | 7/2011 |

(Continued)

OTHER PUBLICATIONS

Al-Harbi, S.H., et al., "Adapting γ-means for supervised clustering," Jun. 2006, Applied Intelligence, vol. 24, Issue 3, pp. 219-226.

(Continued)

*Primary Examiner* — Alicia Baturay
(74) *Attorney, Agent, or Firm* — Polsinelli PC (57) ABSTRACT

Aspects of the instant disclosure relate to methods for facilitating intercloud resource migration. In some embodiments, a method of the subject technology can include steps for instantiating a first intercloud fabric provider platform (ICFPP) at a first cloud datacenter, instantiating a second ICFPP at a second cloud datacenter, and receiving a migration request at the first ICFPP, the migration request including a request to migrate a virtual machine (VM) workload from the first cloud datacenter to the second cloud datacenter. In some aspects, the method may further include steps for initiating, by the first ICFPP, a migration of the VM workload via the second ICFPP in response to the migration request. Systems and machine readable media are also provided.

20 Claims, 6 Drawing Sheets

(56) References Cited

U.S. PATENT DOCUMENTS

| | | | |
|---|---|---|---|
| 6,683,873 B1 | 1/2004 | Kwok et al. | |
| 6,721,804 B1 | 4/2004 | Rubin et al. | |
| 6,733,449 B1 | 5/2004 | Krishnamurthy et al. | |
| 6,735,631 B1 | 5/2004 | Oehrke et al. | |
| 6,885,670 B1 | 4/2005 | Regula | |
| 6,996,615 B1 | 2/2006 | McGuire | |
| 7,054,930 B1 | 5/2006 | Cheriton | |
| 7,058,706 B1 | 6/2006 | Lyer et al. | |
| 7,062,571 B1 | 6/2006 | Dale et al. | |
| 7,076,397 B2 | 7/2006 | Ding et al. | |
| 7,111,177 B1 | 9/2006 | Chauvel et al. | |
| 7,212,490 B1 | 5/2007 | Kao et al. | |
| 7,277,948 B2 | 10/2007 | Igarashi et al. | |
| 7,313,667 B1 | 12/2007 | Pullela et al. | |
| 7,379,846 B1 | 5/2008 | Williams et al. | |
| 7,480,672 B2 | 1/2009 | Hahn et al. | |
| 7,496,043 B1 | 2/2009 | Leong et al. | |
| 7,536,476 B1 | 5/2009 | Alleyne | |
| 7,567,504 B2 | 7/2009 | Darling et al. | |
| 7,606,147 B2 | 10/2009 | Luft et al. | |
| 7,647,594 B2 | 1/2010 | Togawa | |
| 7,684,322 B2 | 3/2010 | Sand et al. | |
| 7,773,510 B2 | 8/2010 | Back et al. | |
| 7,808,897 B1 | 10/2010 | Mehta et al. | |
| 7,881,957 B1 | 2/2011 | Cohen et al. | |
| 7,917,647 B2 | 3/2011 | Cooper et al. | |
| 8,010,598 B2 | 8/2011 | Tanimoto | |
| 8,028,071 B1 | 9/2011 | Mahalingam et al. | |
| 8,041,714 B2 | 10/2011 | Aymeloglu et al. | |
| 8,121,117 B1 | 2/2012 | Amdahl et al. | |
| 8,171,415 B2 | 5/2012 | Appleyard et al. | |
| 8,234,377 B2 | 7/2012 | Cohn | |
| 8,244,559 B2 | 8/2012 | Horvitz et al. | |
| 8,250,215 B2 | 8/2012 | Stienhans et al. | |
| 8,280,880 B1 | 10/2012 | Aymeloglu et al. | |
| 8,284,664 B1 | 10/2012 | Aybay et al. | |
| 8,284,776 B2 | 10/2012 | Petersen | |
| 8,301,746 B2 | 10/2012 | Head et al. | |
| 8,345,692 B2 | 1/2013 | Smith | |
| 8,406,141 B1 | 3/2013 | Couturier et al. | |
| 8,407,413 B1 | 3/2013 | Yucel et al. | |
| 8,448,171 B2 | 5/2013 | Donnellan et al. | |
| 8,477,610 B2 | 7/2013 | Zuo et al. | |
| 8,478,961 B2 * | 7/2013 | Bozek | G06F 9/45558 711/118 |
| 8,495,252 B2 | 7/2013 | Lais et al. | |
| 8,495,356 B2 | 7/2013 | Ashok et al. | |
| 8,510,469 B2 | 8/2013 | Portolani | |
| 8,514,868 B2 * | 8/2013 | Hill | H04L 12/66 370/401 |
| 8,532,108 B2 | 9/2013 | Li et al. | |
| 8,533,687 B1 | 9/2013 | Greifeneder et al. | |
| 8,547,974 B1 | 10/2013 | Guruswamy et al. | |
| 8,560,639 B2 | 10/2013 | Murphy et al. | |
| 8,560,663 B2 | 10/2013 | Baucke et al. | |
| 8,589,543 B2 | 11/2013 | Dutta et al. | |
| 8,590,050 B2 | 11/2013 | Nagpal et al. | |
| 8,611,356 B2 | 12/2013 | Yu et al. | |
| 8,612,625 B2 | 12/2013 | Andreis et al. | |
| 8,630,291 B2 | 1/2014 | Shaffer et al. | |
| 8,639,787 B2 | 1/2014 | Lagergren et al. | |
| 8,656,024 B2 | 2/2014 | Krishnan et al. | |
| 8,660,129 B1 | 2/2014 | Brendel et al. | |
| 8,719,804 B2 | 5/2014 | Jain | |
| 8,775,576 B2 | 7/2014 | Hebert et al. | |
| 8,797,867 B1 | 8/2014 | Chen et al. | |
| 8,805,951 B1 | 8/2014 | Faibish et al. | |
| 8,831,000 B2 * | 9/2014 | Mishra | H04L 12/185 370/390 |
| 8,850,182 B1 | 9/2014 | Fritz et al. | |
| 8,856,339 B2 * | 10/2014 | Mestery | H04L 67/10 709/226 |
| 8,909,780 B1 | 12/2014 | Dickinson et al. | |
| 8,909,928 B2 | 12/2014 | Ahmad et al. | |
| 8,918,510 B2 | 12/2014 | Gmach et al. | |
| 8,924,720 B2 | 12/2014 | Raghuram et al. | |
| 8,930,747 B2 | 1/2015 | Levijarvi et al. | |
| 8,938,775 B1 | 1/2015 | Roth et al. | |
| 8,954,544 B2 * | 2/2015 | Edwards | G06Q 10/10 707/649 |
| 8,959,526 B2 | 2/2015 | Kansal et al. | |
| 8,977,754 B2 | 3/2015 | Curry, Jr. et al. | |
| 9,003,006 B2 * | 4/2015 | Xia | G06F 9/44505 709/223 |
| 9,009,697 B2 | 4/2015 | Breiter et al. | |
| 9,015,324 B2 | 4/2015 | Jackson | |
| 9,043,439 B2 | 5/2015 | Bicket et al. | |
| 9,049,115 B2 | 6/2015 | Rajendran et al. | |
| 9,063,789 B2 | 6/2015 | Beaty et al. | |
| 9,065,727 B1 | 6/2015 | Liu et al. | |
| 9,075,649 B1 | 7/2015 | Bushman et al. | |
| 9,104,334 B2 | 8/2015 | Madhusudana et al. | |
| 9,104,460 B2 * | 8/2015 | Jansen | G06F 9/45558 |
| 9,164,795 B1 | 10/2015 | Vincent | |
| 9,167,050 B2 | 10/2015 | Durazzo et al. | |
| 9,201,701 B2 | 12/2015 | Boldyrev et al. | |
| 9,201,704 B2 * | 12/2015 | Chang | G06F 9/45558 |
| 9,203,784 B2 * | 12/2015 | Chang | H04L 49/70 |
| 9,223,634 B2 * | 12/2015 | Chang | G06F 9/45558 |
| 9,244,776 B2 | 1/2016 | Koza et al. | |
| 9,251,114 B1 | 2/2016 | Ancin et al. | |
| 9,264,478 B2 | 2/2016 | Hon et al. | |
| 9,276,911 B2 * | 3/2016 | Wang | H04L 9/0637 |
| 9,313,048 B2 | 4/2016 | Chang et al. | |
| 9,361,192 B2 | 6/2016 | Smith et al. | |
| 9,380,075 B2 | 6/2016 | He et al. | |
| 9,389,773 B2 * | 7/2016 | Koohestanian | G06F 3/0486 |
| 9,411,534 B2 * | 8/2016 | Lakshman | G06F 3/065 |
| 9,411,626 B2 * | 8/2016 | Ghosh | G06F 9/45533 |
| 9,424,151 B2 * | 8/2016 | Lakshman | G06F 11/2058 |
| 9,432,294 B1 | 8/2016 | Sharma et al. | |
| 9,438,534 B2 * | 9/2016 | Xia | H04L 49/254 |
| 9,444,744 B1 | 9/2016 | Sharma et al. | |
| 9,473,365 B2 | 10/2016 | Melander et al. | |
| 9,483,205 B2 * | 11/2016 | Lakshman | G06F 3/065 |
| 9,503,530 B1 | 11/2016 | Niedzielski | |
| 9,525,564 B2 * | 12/2016 | Lee | H04L 12/4641 |
| 9,553,887 B2 * | 1/2017 | Thakkar | H04L 63/1408 |
| 9,558,078 B2 | 1/2017 | Farlee et al. | |
| 9,558,085 B2 * | 1/2017 | Lakshman | G06F 11/2094 |
| 9,560,037 B2 * | 1/2017 | Bartz | H04L 63/0823 |
| 9,563,480 B2 * | 2/2017 | Messerli | G06F 9/5072 |
| 9,600,320 B2 * | 3/2017 | Hamilton, II | G06F 9/45558 |
| 9,606,826 B2 * | 3/2017 | Ghosh | H04L 47/781 |
| 9,606,828 B2 * | 3/2017 | Ghosh | G06F 9/45558 |
| 9,613,078 B2 | 4/2017 | Vermeulen et al. | |
| 9,626,212 B2 * | 4/2017 | Beveridge | G06F 16/273 |
| 9,628,471 B1 | 4/2017 | Sundaram et al. | |
| 9,632,858 B2 | 4/2017 | Sasturkar et al. | |
| 9,658,876 B2 | 5/2017 | Chang et al. | |
| 9,692,802 B2 | 6/2017 | Bicket et al. | |
| 9,727,359 B2 | 8/2017 | Tsirkin | |
| 9,736,063 B2 | 8/2017 | Wan et al. | |
| 9,755,858 B2 * | 9/2017 | Bagepalli | H04L 12/6418 |
| 9,787,582 B1 * | 10/2017 | Zenker | H04L 67/1095 |
| 9,792,245 B2 | 10/2017 | Raghavan et al. | |
| 9,804,988 B1 | 10/2017 | Ayoub et al. | |
| 9,851,997 B2 * | 12/2017 | Gough | G06F 9/45558 |
| 9,864,530 B2 * | 1/2018 | Lakshman | G06F 3/0619 |
| 9,875,063 B2 * | 1/2018 | Lakshman | G06F 3/0665 |
| 9,935,896 B2 * | 4/2018 | Chang | H04L 49/25 |
| 9,954,783 B1 | 4/2018 | Thirumurthi et al. | |
| 10,050,951 B2 * | 8/2018 | Mathaiyan | H04L 63/08 |
| 10,067,722 B2 * | 9/2018 | Lakshman | G06F 3/0689 |
| 10,382,426 B2 * | 8/2019 | Falodiya | |
| 2002/0004900 A1 | 1/2002 | Patel | |
| 2002/0073337 A1 | 6/2002 | Ioele et al. | |
| 2002/0143928 A1 | 10/2002 | Maltz et al. | |
| 2002/0166117 A1 | 11/2002 | Abrams et al. | |
| 2002/0174216 A1 | 11/2002 | Shorey et al. | |
| 2003/0018591 A1 | 1/2003 | Komisky | |
| 2003/0056001 A1 | 3/2003 | Mate et al. | |
| 2003/0228585 A1 | 12/2003 | Inoko et al. | |
| 2004/0004941 A1 | 1/2004 | Malan et al. | |

(56) References Cited

U.S. PATENT DOCUMENTS

| | | |
|---|---|---|
| 2004/0095237 A1 | 5/2004 | Chen et al. |
| 2004/0131059 A1 | 7/2004 | Ayyakad et al. |
| 2004/0264481 A1 | 12/2004 | Darling et al. |
| 2005/0060418 A1 | 3/2005 | Sorokopud |
| 2005/0125424 A1 | 6/2005 | Herriott et al. |
| 2006/0059558 A1 | 3/2006 | Selep et al. |
| 2006/0104286 A1 | 5/2006 | Cheriton |
| 2006/0120575 A1 | 6/2006 | Ahn et al. |
| 2006/0126665 A1 | 6/2006 | Ward et al. |
| 2006/0146825 A1 | 7/2006 | Hofstaedter et al. |
| 2006/0155875 A1 | 7/2006 | Cheriton |
| 2006/0168338 A1 | 7/2006 | Bruegl et al. |
| 2006/0294207 A1 | 12/2006 | Barsness et al. |
| 2007/0011330 A1 | 1/2007 | Dinker et al. |
| 2007/0174663 A1 | 7/2007 | Crawford et al. |
| 2007/0223487 A1 | 9/2007 | Kajekar et al. |
| 2007/0242830 A1 | 10/2007 | Conrado et al. |
| 2008/0005293 A1 | 1/2008 | Bhargava et al. |
| 2008/0084880 A1 | 4/2008 | Dharwadkar |
| 2008/0165778 A1 | 7/2008 | Ertemalp |
| 2008/0198752 A1 | 8/2008 | Fan et al. |
| 2008/0201711 A1 | 8/2008 | Amir Husain |
| 2008/0235755 A1 | 9/2008 | Blaisdell et al. |
| 2009/0006527 A1 | 1/2009 | Gingell, Jr. et al. |
| 2009/0010277 A1 | 1/2009 | Halbraich et al. |
| 2009/0019367 A1 | 1/2009 | Cavagnari et al. |
| 2009/0031312 A1 | 1/2009 | Mausolf et al. |
| 2009/0083183 A1 | 3/2009 | Rao et al. |
| 2009/0138763 A1 | 5/2009 | Arnold |
| 2009/0177775 A1 | 7/2009 | Radia et al. |
| 2009/0178058 A1 | 7/2009 | Stillwell, III et al. |
| 2009/0182874 A1 | 7/2009 | Morford et al. |
| 2009/0265468 A1 | 10/2009 | Annambhotla et al. |
| 2009/0265753 A1 | 10/2009 | Anderson et al. |
| 2009/0293056 A1 | 11/2009 | Ferris |
| 2009/0300608 A1 | 12/2009 | Ferris et al. |
| 2009/0313562 A1 | 12/2009 | Appleyard et al. |
| 2009/0323706 A1 | 12/2009 | Germain et al. |
| 2009/0328031 A1 | 12/2009 | Pouyadou et al. |
| 2010/0042720 A1 | 2/2010 | Stienhans et al. |
| 2010/0061250 A1 | 3/2010 | Nugent |
| 2010/0115341 A1 | 5/2010 | Baker et al. |
| 2010/0131765 A1 | 5/2010 | Bromley et al. |
| 2010/0191783 A1 | 7/2010 | Mason et al. |
| 2010/0192157 A1 | 7/2010 | Jackson et al. |
| 2010/0205601 A1 | 8/2010 | Abbas et al. |
| 2010/0211782 A1 | 8/2010 | Auradkar et al. |
| 2010/0217886 A1 | 8/2010 | Seren et al. |
| 2010/0293270 A1 | 11/2010 | Augenstein et al. |
| 2010/0318609 A1 | 12/2010 | Lahiri et al. |
| 2010/0325199 A1 | 12/2010 | Park et al. |
| 2010/0325257 A1 | 12/2010 | Goel et al. |
| 2010/0325441 A1 | 12/2010 | Laurie et al. |
| 2010/0333116 A1 | 12/2010 | Prahlad et al. |
| 2011/0016214 A1 | 1/2011 | Jackson |
| 2011/0035754 A1 | 2/2011 | Srinivasan |
| 2011/0055396 A1 | 3/2011 | Dehaan |
| 2011/0055398 A1 | 3/2011 | Dehaan et al. |
| 2011/0055470 A1 | 3/2011 | Portolani |
| 2011/0072489 A1 | 3/2011 | Parann-Nissany |
| 2011/0075667 A1 | 3/2011 | Li et al. |
| 2011/0110382 A1 | 5/2011 | Jabr et al. |
| 2011/0116443 A1 | 5/2011 | Yu et al. |
| 2011/0126099 A1 | 5/2011 | Anderson et al. |
| 2011/0138055 A1 | 6/2011 | Daly et al. |
| 2011/0145413 A1 | 6/2011 | Dawson et al. |
| 2011/0145657 A1 | 6/2011 | Bishop et al. |
| 2011/0173303 A1 | 7/2011 | Rider |
| 2011/0185063 A1 | 7/2011 | Head et al. |
| 2011/0199902 A1 | 8/2011 | Leavy et al. |
| 2011/0213687 A1 | 9/2011 | Ferris et al. |
| 2011/0213966 A1 | 9/2011 | Fu et al. |
| 2011/0219434 A1 | 9/2011 | Betz et al. |
| 2011/0231715 A1 | 9/2011 | Kunii et al. |
| 2011/0231899 A1 | 9/2011 | Pulier et al. |
| 2011/0239039 A1 | 9/2011 | Dieffenbach et al. |
| 2011/0252327 A1 | 10/2011 | Awasthi et al. |
| 2011/0261811 A1 | 10/2011 | Battestilli et al. |
| 2011/0261828 A1 | 10/2011 | Smith |
| 2011/0276675 A1 | 11/2011 | Singh et al. |
| 2011/0276951 A1 | 11/2011 | Jain |
| 2011/0295998 A1 | 12/2011 | Ferris et al. |
| 2011/0305149 A1 | 12/2011 | Scott et al. |
| 2011/0307531 A1 | 12/2011 | Gaponenko et al. |
| 2011/0320870 A1 | 12/2011 | Kenigsberg et al. |
| 2012/0005724 A1 | 1/2012 | Lee |
| 2012/0023418 A1 | 1/2012 | Frields et al. |
| 2012/0054367 A1 | 3/2012 | Ramakrishnan et al. |
| 2012/0072318 A1 | 3/2012 | Akiyama et al. |
| 2012/0072578 A1 | 3/2012 | Alam |
| 2012/0072581 A1 | 3/2012 | Tung et al. |
| 2012/0072985 A1 | 3/2012 | Davne et al. |
| 2012/0072992 A1 | 3/2012 | Arasaratnam et al. |
| 2012/0084445 A1 | 4/2012 | Brock et al. |
| 2012/0084782 A1 | 4/2012 | Chou et al. |
| 2012/0096134 A1 | 4/2012 | Suit |
| 2012/0102193 A1 | 4/2012 | Rathore et al. |
| 2012/0102199 A1 | 4/2012 | Hopmann et al. |
| 2012/0131174 A1 | 5/2012 | Ferris et al. |
| 2012/0137215 A1 | 5/2012 | Kawara |
| 2012/0137289 A1* | 5/2012 | Nolterieke .......... G06F 9/45558 718/1 |
| 2012/0158967 A1 | 6/2012 | Sedayao et al. |
| 2012/0159097 A1 | 6/2012 | Jennas, II et al. |
| 2012/0166649 A1 | 6/2012 | Watanabe et al. |
| 2012/0167094 A1 | 6/2012 | Suit |
| 2012/0173541 A1 | 7/2012 | Venkatarannani |
| 2012/0173710 A1 | 7/2012 | Rodriguez |
| 2012/0179909 A1 | 7/2012 | Sagi et al. |
| 2012/0180044 A1 | 7/2012 | Donnellan et al. |
| 2012/0182891 A1 | 7/2012 | Lee et al. |
| 2012/0185632 A1 | 7/2012 | Lais et al. |
| 2012/0185913 A1 | 7/2012 | Martinez et al. |
| 2012/0192016 A1 | 7/2012 | Gotesdyner et al. |
| 2012/0192075 A1 | 7/2012 | Ebtekar et al. |
| 2012/0201135 A1 | 8/2012 | Ding et al. |
| 2012/0203908 A1 | 8/2012 | Beaty et al. |
| 2012/0204169 A1 | 8/2012 | Breiter et al. |
| 2012/0204187 A1 | 8/2012 | Breiter et al. |
| 2012/0214506 A1 | 8/2012 | Skaaksrud et al. |
| 2012/0222106 A1 | 8/2012 | Kuehl |
| 2012/0236716 A1 | 9/2012 | Anbazhagan et al. |
| 2012/0240113 A1 | 9/2012 | Hur |
| 2012/0265976 A1 | 10/2012 | Spiers et al. |
| 2012/0272025 A1 | 10/2012 | Park et al. |
| 2012/0272243 A1* | 10/2012 | Nolterieke .......... G06F 9/45558 718/1 |
| 2012/0281706 A1 | 11/2012 | Agarwal et al. |
| 2012/0281708 A1 | 11/2012 | Chauhan et al. |
| 2012/0290647 A1 | 11/2012 | Ellison et al. |
| 2012/0297238 A1 | 11/2012 | Watson et al. |
| 2012/0311106 A1 | 12/2012 | Morgan |
| 2012/0311568 A1 | 12/2012 | Jansen |
| 2012/0324092 A1 | 12/2012 | Brown et al. |
| 2012/0324114 A1 | 12/2012 | Dutta et al. |
| 2013/0003567 A1 | 1/2013 | Gallant et al. |
| 2013/0013248 A1 | 1/2013 | Brugler et al. |
| 2013/0036213 A1 | 2/2013 | Hasan et al. |
| 2013/0044636 A1 | 2/2013 | Koponen et al. |
| 2013/0066939 A1* | 3/2013 | Shao .................. H04L 67/2814 709/201 |
| 2013/0066940 A1 | 3/2013 | Shao |
| 2013/0069950 A1 | 3/2013 | Adam et al. |
| 2013/0080509 A1 | 3/2013 | Wang |
| 2013/0080624 A1 | 3/2013 | Nagai et al. |
| 2013/0091557 A1 | 4/2013 | Gurrapu |
| 2013/0097601 A1 | 4/2013 | Podvratnik et al. |
| 2013/0104140 A1 | 4/2013 | Meng et al. |
| 2013/0111540 A1 | 5/2013 | Sabin |
| 2013/0117337 A1 | 5/2013 | Dunham |
| 2013/0124712 A1 | 5/2013 | Parker |
| 2013/0125124 A1 | 5/2013 | Kempf et al. |
| 2013/0138816 A1 | 5/2013 | Kuo et al. |
| 2013/0144978 A1 | 6/2013 | Jain et al. |

(56) References Cited

U.S. PATENT DOCUMENTS

| | | |
|---|---|---|
| 2013/0152076 A1 | 6/2013 | Patel |
| 2013/0152175 A1 | 6/2013 | Hromoko et al. |
| 2013/0159097 A1 | 6/2013 | Schory et al. |
| 2013/0159496 A1 | 6/2013 | Hamilton et al. |
| 2013/0160008 A1 | 6/2013 | Cawlfield et al. |
| 2013/0162753 A1 | 6/2013 | Hendrickson et al. |
| 2013/0169666 A1 | 7/2013 | Pacheco et al. |
| 2013/0179941 A1 | 7/2013 | McGloin et al. |
| 2013/0182712 A1 | 7/2013 | Aguayo et al. |
| 2013/0185413 A1 | 7/2013 | Beaty et al. |
| 2013/0185433 A1 | 7/2013 | Zhu et al. |
| 2013/0191106 A1 | 7/2013 | Kephart et al. |
| 2013/0198050 A1 | 8/2013 | Shroff et al. |
| 2013/0198374 A1 | 8/2013 | Zalmanovitch et al. |
| 2013/0204849 A1 | 8/2013 | Chacko |
| 2013/0232491 A1 | 9/2013 | Radhakrishnan et al. |
| 2013/0232492 A1 | 9/2013 | Wang |
| 2013/0246588 A1 | 9/2013 | Borowicz et al. |
| 2013/0250770 A1 | 9/2013 | Zou et al. |
| 2013/0254415 A1 | 9/2013 | Fullen et al. |
| 2013/0262347 A1 | 10/2013 | Dodson |
| 2013/0283364 A1 | 10/2013 | Chang et al. |
| 2013/0291121 A1* | 10/2013 | Iovanov .................. G06F 9/541 726/28 |
| 2013/0297769 A1 | 11/2013 | Chang et al. |
| 2013/0318240 A1 | 11/2013 | Hebert et al. |
| 2013/0318546 A1 | 11/2013 | Kothuri et al. |
| 2013/0339949 A1 | 12/2013 | Spiers et al. |
| 2014/0006481 A1 | 1/2014 | Frey et al. |
| 2014/0006535 A1 | 1/2014 | Reddy |
| 2014/0006585 A1 | 1/2014 | Dunbar et al. |
| 2014/0007092 A1* | 1/2014 | Barbee .................. G06F 9/4856 718/1 |
| 2014/0019639 A1 | 1/2014 | Ueno |
| 2014/0040473 A1 | 2/2014 | Ho et al. |
| 2014/0040883 A1 | 2/2014 | Tompkins |
| 2014/0052877 A1 | 2/2014 | Mao |
| 2014/0059310 A1 | 2/2014 | Du et al. |
| 2014/0074850 A1 | 3/2014 | Noel et al. |
| 2014/0075048 A1 | 3/2014 | Yuksel et al. |
| 2014/0075108 A1 | 3/2014 | Dong et al. |
| 2014/0075357 A1 | 3/2014 | Flores et al. |
| 2014/0075501 A1 | 3/2014 | Srinivasan et al. |
| 2014/0089727 A1 | 3/2014 | Cherkasova et al. |
| 2014/0098762 A1 | 4/2014 | Ghai et al. |
| 2014/0108985 A1 | 4/2014 | Scott et al. |
| 2014/0122560 A1 | 5/2014 | Ramey et al. |
| 2014/0136779 A1 | 5/2014 | Guha et al. |
| 2014/0140211 A1 | 5/2014 | Chandrasekaran et al. |
| 2014/0141720 A1 | 5/2014 | Princen et al. |
| 2014/0156557 A1 | 6/2014 | Zeng et al. |
| 2014/0160924 A1 | 6/2014 | Pfautz et al. |
| 2014/0164486 A1 | 6/2014 | Ravichandran et al. |
| 2014/0188825 A1 | 7/2014 | Muthukkaruppan et al. |
| 2014/0189095 A1 | 7/2014 | Lindberg et al. |
| 2014/0189125 A1 | 7/2014 | Amies et al. |
| 2014/0215471 A1 | 7/2014 | Cherkasova |
| 2014/0222953 A1 | 8/2014 | Karve et al. |
| 2014/0244851 A1 | 8/2014 | Lee |
| 2014/0245298 A1 | 8/2014 | Zhou et al. |
| 2014/0269266 A1 | 9/2014 | Filsfils et al. |
| 2014/0280805 A1 | 9/2014 | Sawalha |
| 2014/0282536 A1 | 9/2014 | Dave et al. |
| 2014/0282611 A1 | 9/2014 | Campbell et al. |
| 2014/0282669 A1 | 9/2014 | McMillan |
| 2014/0282889 A1 | 9/2014 | Ishaya et al. |
| 2014/0289200 A1 | 9/2014 | Kato |
| 2014/0297569 A1 | 10/2014 | Clark et al. |
| 2014/0297835 A1 | 10/2014 | Buys |
| 2014/0314078 A1 | 10/2014 | Jilani |
| 2014/0317261 A1 | 10/2014 | Shatzkamer et al. |
| 2014/0366155 A1 | 12/2014 | Chang et al. |
| 2014/0372567 A1 | 12/2014 | Ganesh et al. |
| 2015/0006470 A1 | 1/2015 | Mohan |
| 2015/0033086 A1 | 1/2015 | Sasturkar et al. |
| 2015/0043335 A1 | 2/2015 | Testicioglu et al. |
| 2015/0043576 A1 | 2/2015 | Dixon et al. |
| 2015/0052247 A1 | 2/2015 | Threefoot et al. |
| 2015/0052517 A1 | 2/2015 | Raghu et al. |
| 2015/0058382 A1 | 2/2015 | St. Laurent et al. |
| 2015/0058459 A1 | 2/2015 | Amendjian et al. |
| 2015/0058557 A1 | 2/2015 | Madhusudana et al. |
| 2015/0070516 A1 | 3/2015 | Shoemake et al. |
| 2015/0071285 A1 | 3/2015 | Kumar et al. |
| 2015/0089478 A1 | 3/2015 | Cheluvaraju et al. |
| 2015/0100471 A1 | 4/2015 | Curry, Jr. et al. |
| 2015/0106802 A1 | 4/2015 | Ivanov et al. |
| 2015/0106805 A1 | 4/2015 | Melander et al. |
| 2015/0109923 A1 | 4/2015 | Hwang |
| 2015/0117199 A1 | 4/2015 | Chinnaiah Sankaran et al. |
| 2015/0117458 A1 | 4/2015 | Gurkan et al. |
| 2015/0120914 A1 | 4/2015 | Wada et al. |
| 2015/0149828 A1 | 5/2015 | Mukerji et al. |
| 2015/0178133 A1 | 6/2015 | Phelan et al. |
| 2015/0215819 A1 | 7/2015 | Bosch et al. |
| 2015/0227405 A1 | 8/2015 | Jan et al. |
| 2015/0242204 A1 | 8/2015 | Hassine et al. |
| 2015/0249709 A1 | 9/2015 | Teng et al. |
| 2015/0271199 A1 | 9/2015 | Bradley et al. |
| 2015/0280980 A1 | 10/2015 | Bitar |
| 2015/0281067 A1 | 10/2015 | Wu |
| 2015/0281113 A1 | 10/2015 | Siciliano et al. |
| 2015/0309908 A1 | 10/2015 | Pearson et al. |
| 2015/0319063 A1 | 11/2015 | Zourzouvillys et al. |
| 2015/0326524 A1 | 11/2015 | Tankala et al. |
| 2015/0339210 A1 | 11/2015 | Kopp et al. |
| 2015/0373108 A1 | 12/2015 | Fleming et al. |
| 2015/0379062 A1 | 12/2015 | Vermeulen et al. |
| 2016/0011925 A1 | 1/2016 | Kulkarni et al. |
| 2016/0013990 A1 | 1/2016 | Kulkarni et al. |
| 2016/0062786 A1 | 3/2016 | Meng et al. |
| 2016/0065417 A1 | 3/2016 | Sapuram et al. |
| 2016/0094398 A1 | 3/2016 | Choudhury et al. |
| 2016/0094480 A1 | 3/2016 | Kulkarni et al. |
| 2016/0094643 A1 | 3/2016 | Jain et al. |
| 2016/0094894 A1 | 3/2016 | Inayatullah et al. |
| 2016/0099847 A1 | 4/2016 | Melander et al. |
| 2016/0099873 A1 | 4/2016 | Gerö et al. |
| 2016/0103699 A1* | 4/2016 | Thakkar .............. G06F 9/45558 718/1 |
| 2016/0103838 A1 | 4/2016 | Sainani et al. |
| 2016/0105321 A1* | 4/2016 | Thakkar .............. H04L 41/0853 709/220 |
| 2016/0105393 A1 | 4/2016 | Thakkar et al. |
| 2016/0127184 A1 | 5/2016 | Bursell |
| 2016/0134557 A1 | 5/2016 | Steinder et al. |
| 2016/0147676 A1 | 5/2016 | Cha et al. |
| 2016/0162436 A1 | 6/2016 | Raghavan et al. |
| 2016/0164914 A1 | 6/2016 | Madhav et al. |
| 2016/0188527 A1 | 6/2016 | Cherian et al. |
| 2016/0234071 A1 | 8/2016 | Nambiar et al. |
| 2016/0239399 A1 | 8/2016 | Babu et al. |
| 2016/0248669 A1* | 8/2016 | Natarajan .............. H04L 47/125 |
| 2016/0253078 A1 | 9/2016 | Ebtekar et al. |
| 2016/0254968 A1 | 9/2016 | Ebtekar et al. |
| 2016/0259662 A1* | 9/2016 | Ghosh .................. G06F 9/45533 |
| 2016/0261564 A1 | 9/2016 | Foxhoven et al. |
| 2016/0277368 A1 | 9/2016 | Narayanaswamy et al. |
| 2016/0292611 A1 | 10/2016 | Boe et al. |
| 2016/0352682 A1 | 12/2016 | Chang |
| 2016/0378389 A1 | 12/2016 | Hrischuk et al. |
| 2017/0005948 A1 | 1/2017 | Melander et al. |
| 2017/0024260 A1 | 1/2017 | Chandrasekaran et al. |
| 2017/0026470 A1 | 1/2017 | Bhargava et al. |
| 2017/0034199 A1 | 2/2017 | Zaw |
| 2017/0041342 A1 | 2/2017 | Efremov et al. |
| 2017/0054659 A1 | 2/2017 | Ergin et al. |
| 2017/0060615 A1* | 3/2017 | Thakkar .............. G06F 9/45558 |
| 2017/0063674 A1 | 3/2017 | Maskalik et al. |
| 2017/0097841 A1 | 4/2017 | Chang et al. |
| 2017/0099188 A1 | 4/2017 | Chang et al. |
| 2017/0104755 A1* | 4/2017 | Arregoces .............. H04L 63/10 |
| 2017/0126583 A1 | 5/2017 | Xia |
| 2017/0147297 A1 | 5/2017 | Krishnamurthy et al. |

(56) References Cited

U.S. PATENT DOCUMENTS

| | | | |
|---|---|---|---|
| 2017/0163569 | A1 | 6/2017 | Koganti |
| 2017/0171157 | A1* | 6/2017 | Hristov ............... H04L 63/0272 |
| 2017/0171158 | A1 | 6/2017 | Hoy et al. |
| 2017/0192823 | A1 | 7/2017 | Karaje et al. |
| 2017/0264663 | A1 | 9/2017 | Bicket et al. |
| 2017/0277555 | A1* | 9/2017 | Gautam ............... G06F 9/45558 |
| 2017/0302521 | A1 | 10/2017 | Lui et al. |
| 2017/0310556 | A1 | 10/2017 | Knowles et al. |
| 2017/0317932 | A1 | 11/2017 | Paramasivam |
| 2017/0339070 | A1 | 11/2017 | Chang et al. |
| 2018/0069885 | A1 | 3/2018 | Patterson et al. |
| 2018/0173372 | A1 | 6/2018 | Greenspan et al. |
| 2018/0174060 | A1 | 6/2018 | Velez-Rojas et al. |

FOREIGN PATENT DOCUMENTS

| | | |
|---|---|---|
| CN | 102164091 | 8/2011 |
| CN | 104320342 | 1/2015 |
| CN | 105740084 | 7/2016 |
| EP | 2228719 | 9/2010 |
| EP | 2439637 | 4/2012 |
| EP | 2645253 | 11/2014 |
| KR | 10-2015-0070676 | 5/2015 |
| TW | M394537 | 12/2010 |
| WO | WO 2009/155574 | 12/2009 |
| WO | WO 2010/030915 | 3/2010 |
| WO | WO 2013/158707 | 10/2013 |

OTHER PUBLICATIONS

Bohner, Shawn A., "Extending Software Change Impact Analysis into COTS Components," 2003, IEEE, 8 pages.
Hood, C. S., et al., "Automated Proactive Anomaly Detection," 1997, Springer Science and Business Media Dordrecht, pp. 688-699.
Vilalta R., et al., "An efficient approach to external cluster assessment with an application to martian topography," Feb. 2007, 23 pages, Data Mining and Knowledge Discovery 14.1: 1-23. New York: Springer Science & Business Media.
Amedro, Brian, et al., "An Efficient Framework for Running Applications on Clusters, Grids and Cloud," 2010, 17 pages.
Author Unknown, "A Look at DeltaCloud: The Multi-Cloud API," Feb. 17, 2012, 4 pages.
Author Unknown, "About Deltacloud," Apache Software Foundation, Aug. 18, 2013, 1 page.
Author Unknown, "Architecture for Managing Clouds, A White Paper from the Open Cloud Standards Incubator," Version 1.0.0, Document No. DSP-IS0102, Jun. 18, 2010, 57 pages.
Author Unknown, "Cloud Infrastructure Management Interface—Common Information Model (CIMI-CIM)," Document No. DSP0264, Version 1.0.0, Dec. 14, 2012, 21 pages.
Author Unknown, "Cloud Infrastructure Management Interface (CIMI) Primer," Document No. DSP2027, Version 1.0.1, Sep. 12, 2012, 30 pages.
Author Unknown, "cloudControl Documentation," Aug. 25, 2013, 14 pages.
Author Unknown, "Interoperable Clouds, A White Paper from the Open Cloud Standards Incubator," Version 1.0.0, Document No. DSP-IS0101, Nov. 11, 2009, 21 pages.
Author Unknown, "Microsoft Cloud Edge Gateway (MCE) Series Appliance," Iron Networks, Inc., 2014, 4 pages.
Author Unknown, "Use Cases and Interactions for Managing Clouds, A White Paper from the Open Cloud Standards Incubator," Version 1.0.0, Document No. DSP-ISO0103, Jun. 16, 2010, 75 pages.
Author Unknown, "Apache Ambari Meetup What's New," Hortonworks Inc., Sep. 2013, 28 pages.
Author Unknown, "Introduction," Apache Ambari project, Apache Software Foundation, 2014, 1 page.
Citrix, "Citrix StoreFront 2.0" White Paper, Proof of Concept Implementation Guide, Citrix Systems, Inc., 2013, 48 pages.
Citrix, "Deployment Practices and Guidelines for NetScaler 10.5 on Amazon Web Services," White Paper, citrix.com, 2014, 14 pages.
Gedymin, Adam, "Cloud Computing with an emphasis on Google App Engine," Sep. 2011, 146 pages.
Good, Nathan A., "Use Apache Deltacloud to administer multiple instances with a single API," Dec. 17, 2012, 7 pages.
Kunz, Thomas, et al., "OmniCloud—The Secure and Flexible Use of Cloud Storage Services," 2014, 30 pages.
Logan, Marcus, "Hybrid Cloud Application Architecture for Elastic Java-Based Web Applications," F5 Deployment Guide Version 1.1, 2016, 65 pages.
Lynch, Sean, "Monitoring cache with Claspin" Facebook Engineering, Sep. 19, 2012, 5 pages.
Meireles, Fernando Miguel Dias, "Integrated Management of Cloud Computing Resources," 2013-2014, 286 pages.
Mu, Shuai, et al., "uLibCloud: Providing High Available and Uniform Accessing to Multiple Cloud Storages," 2012 IEEE, 8 pages.
Sun, Aobing, et al., "IaaS Public Cloud Computing Platform Scheduling Model and Optimization Analysis," Int. J. Communications, Network and System Sciences, 2011, 4, 803-811, 9 pages.
Szymaniak, Michal, et al., "Latency-Driven Replica Placement", vol. 47 No. 8, IPSJ Journal, Aug. 2006, 12 pages.
Toews, Everett, "Introduction to Apache jclouds," Apr. 7, 2014, 23 pages.
Von Laszewski, Gregor, et al., "Design of a Dynamic Provisioning System for a Federated Cloud and Bare-metal Environment," 2012, 8 pages.
Ye, Xianglong, et al., "A Novel Blocks Placement Strategy for Hadoop," 2012 IEEE/ACTS 11th International Conference on Computer and Information Science, 2012 IEEE, 5 pages.
Author Unknown, "5 Benefits of a Storage Gateway in the Cloud," Blog, TwinStrata, Inc., Jul. 25, 2012, XP055141645, 4 pages, https://web.archive.org/web/20120725092619/http://blog.twinstrata.com/2012/07/10//5-benefits-of-a-storage-gateway-in-the-cloud.
Author Unknown, "Joint Cisco and VMWare Solution for Optimizing Virtual Desktop Delivery: Data Center 3.0: Solutions to Accelerate Data Center Virtualization," Cisco Systems, Inc. and VMware, Inc., Sep. 2008, 10 pages.
Author Unknown, "Open Data Center Alliance Usage: Virtual Machine (VM) Interoperability in a Hybrid Cloud Environment Rev. 1.2," Open Data Center Alliance, Inc., 2013, 18 pages.
Author Unknown, "Real-Time Performance Monitoring on Juniper Networks Devices, Tips and Tools for Assessing and Analyzing Network Efficiency," Juniper Networks, Inc., May 2010, 35 pages.
Beyer, Steffen, "Module "Data::Locations?!"," YAPC::Europe, London, UK,ICA, Sep. 22-24, 2000, XP002742700, 15 pages.
Borovick, Lucinda, et al., "Architecting the Network for the Cloud," IDC White Paper, Jan. 2011, 8 pages.
Bosch, Greg, "Virtualization," last modified Apr. 2012 by B. Davison, 33 pages.
Broadcasters Audience Research Board, "What's Next," http://lwww.barb.co.uk/whats-next, accessed Jul. 22, 2015, 2 pages.
Cisco Systems, Inc. "Best Practices in Deploying Cisco Nexus 1000V Series Switches on Cisco UCS B and C Series Cisco UCS Manager Servers," Cisco White Paper, Apr. 2011, 36 pages, http://www.cisco.com/en/US/prod/collateral/switches/ps9441/ps9902/white_paper_c11-558242.pdf.
Cisco Systems, Inc., "Cisco Unified Network Services: Overcome Obstacles to Cloud-Ready Deployments," Cisco White Paper, Jan. 2011, 6 pages.
Cisco Systems, Inc., "Cisco Intercloud Fabric: Hybrid Cloud with Choice, Consistency, Control and Compliance," Dec. 10, 2014, 22 pages.
Cisco Technology, Inc., "Cisco Expands Videoscape TV Platform Into the Cloud," Jan. 6, 2014, Las Vegas, Nevada, Press Release, 3 pages.
CSS Corp, "Enterprise Cloud Gateway (ECG)—Policy driven framework for managing multi-cloud environments," original published on or about Feb. 11, 2012; 1 page; http://www.css-cloud.com/platform/enterprise-cloud-gateway.php.

(56) References Cited

OTHER PUBLICATIONS

Fang K., "LISP MAC-EID-TO-RLOC Mapping (LISP based L2VPN)," Network Working Group, Internet Draft, CISCO Systems, Jan. 2012, 12 pages.
Herry, William, "Keep It Simple, Stupid: OpenStack nova-scheduler and its algorithm", May 12, 2012, IBM, 12 pages.
Hewlett-Packard Company, "Virtual context management on network devices", Research Disclosure, vol. 564, No. 60, Apr. 1, 2011, Mason Publications, Hampshire, GB, Apr. 1, 2011, 524.
Juniper Networks, Inc., "Recreating Real Application Traffic in Junosphere Lab," Solution Brief, Dec. 2011, 3 pages.
Kenhui, "Musings on Cloud Computing and IT-as-a-Service: [Updated for Havana] Openstack Computer for VSphere Admins, Part 2: Nova-Scheduler and DRS", Jun. 26, 2013, Cloud Architect Musings, 12 pages.
Kolyshkin, Kirill, "Virtualization in Linux," Sep. 1, 2006, XP055141648, 5 pages, https://web.archive.org/web/20070120205111/http://download.openvz.org/doc/openvz-intro.pdf.
Lerach, S.R.O., "Golem," http://www.lerach.cz/en/products/golem, accessed Jul. 22, 2015, 2 pages.
Linthicum, David, "VM Import could be a game changer for hybrid clouds", InfoWorld, Dec. 23, 2010, 4 pages.
Naik, Vijay K., et al., "Harmony: A Desktop Grid for Delivering Enterprise Computations," Grid Computing, 2003, Fourth International Workshop on Proceedings, Nov. 17, 2003, pp. 1-11.
Nair, Srijith K. et al., "Towards Secure Cloud Bursting, Brokerage and Aggregation," 2012, 8 pages, www.flexiant.com.
Nielsen, "SimMetry Audience Measurement—Technology," http://www.nielsen-admosphere.eu/products-and-services/simmetry-audience-measurement-technology/, accessed Jul. 22, 2015, 6 pages.
Nielsen, "Television," http://www.nielsen.com/us/en/solutions/measurement/television.html, accessed Jul. 22, 2015, 4 pages.
Open Stack, "Filter Scheduler," updated Dec. 17, 2017, 5 pages, accessed on Dec. 18, 2017, https://docs.openstack.org/nova/latest/user/filter-scheduler.html.
Rabadan, J., et al., "Operational Aspects of Proxy-ARP/ND in EVPN Networks," BESS Worksgroup Internet Draft, draft-snr-bess-evpn-proxy-arp-nd-02, Oct. 6, 2015, 22 pages.
Saidi, Ali, et al., "Performance Validation of Network-Intensive Workloads on a Full-System Simulator," Interaction between Operating System and Computer Architecture Workshop, (IOSCA 2005), Austin, Texas, Oct. 2005, 10 pages.
Shunra, "Shunra for HP Software; Enabling Confidence in Application Performance Before Deployment," 2010, 2 pages.
Son, Jungmin, "Automatic decision system for efficient resource selection and allocation in inter-clouds," Jun. 2013, 35 pages.
Wikipedia, "Filter (software)", Wikipedia, Feb. 8, 2014, 2 pages, https://en.wikipedia.org/w/index.php?title=Filter_%28software%29&oldid=594544359.
Wikipedia; "Pipeline (Unix)", Wikipedia, May 4, 2014, 4 pages, https://en.wikipedia.org/w/index.php?title=Pipeline2/028Unix%29&oldid=606980114.

\* cited by examiner

FIG. 6B

DISTRIBUTED HYBRID CLOUD ORCHESTRATION MODEL

TECHNICAL FIELD

This disclosure relates generally to communications systems, more particularly, to providing network resources in a hybrid cloud environment.

BACKGROUND

Data centers include a complex network of hardware and software that form "clouds," used to host applications and store data. An enterprise data center, for example, can be used to provide services for a number of customers, with each customer accessing data center resources by way of one or more private networks. Enterprise data centers can provide dynamic "virtual networks" that support server and desktop virtualization. When an enterprise data center runs out of capacity (e.g., storage or computing resources, etc.), an enterprise service provider can add additional hardware, resulting in an increase in data center hardware and/or operational costs. As another option, the enterprise service provider may contract or lease additional computing resources from another cloud, such as, a public cloud data center.

When an enterprise data center shares or leases computing resources from another data center (e.g., a public cloud data center), the resultant combination of computing resources is referred to as a "hybrid" cloud. A hybrid cloud generally includes a cloud infrastructure composed of two or more clouds that inter-operate network communication, such as a network overlay. Therefore hybrid cloud can represent an interaction between multiple clouds, such as private and public clouds, where a private cloud joins a public cloud and utilizes public cloud resources in a secure and scalable way. Despite numerous advantages offered by hybrid cloud environments, the expansion of cloud services, and/or migration of workloads between cloud environments is often onerous and complex.

BRIEF DESCRIPTION OF THE DRAWINGS

The embodiments herein may be better understood by referring to the following description in conjunction with the accompanying drawings in which like reference numerals indicate similar elements. Understanding that these drawings depict only exemplary embodiments of the disclosure and are not therefore to be considered to be limiting of its scope, the principles herein are described and explained with additional specificity and detail through the use of the accompanying drawings in which.

OVERVIEW

Aspects of the disclosed technology relate to methods for facilitating intercloud resource migration. In some implementations, the method can include steps for instantiating a first intercloud fabric provider platform (ICFPP) at a first cloud datacenter, instantiating a second ICFPP at a second cloud datacenter, and receiving a migration request at the first ICFPP, for example, from an intercloud fabric director (ICFD). The migration request can include a request to migrate a virtual machine (VM) workload from the first cloud datacenter to the second cloud datacenter. In some approaches, the method can also include steps for initiating, by the first ICFPP, a migration of the VM workload via the second ICFPP in response to the migration request.

DESCRIPTION

Some cloud architectures support an Intercloud Fabric (ICF) solution that facilitates the extension of enterprise infrastructures (e.g., network and/or storage, etc.) to other cloud environments, such as public clouds. Infrastructure can be used for fulfilling various hybrid cloud use cases, including workload migration, cloud bursting, and/or disaster recovery. ICF cloud extension is sometimes performed through the creation of network extensions that stretch the enterprise network into the cloud datacenter, for example, so that virtual machines (VMs) and related network and security policies are preserved when instantiated on the public datacenter.

As the use of cloud platforms in the computing industry continues to evolve, there is an increasing demand for cloud migration services. In particular, there is an increasing need to share infrastructure and services between different clouds, for example, culminating in a "multicloud." In such multicloud environments, there are many use cases in which cloud-to-cloud migrations are desired, such as in VM migration, and/or backup disaster relief scenarios. However, conventional ICF cloud orchestration models are challenged by the cloud-to-cloud migration requirements inherent in current multicloud deployments.

In particular, existing orchestration models are typically designed to support enterprise-to-cloud and cloud-to-enterprise hybrid use cases, and therefore rely heavily core application logic residing at the enterprise cloud. Accordingly, aspects of the subject technology provide an improved distributed hybrid orchestration model, for example, in which a novel Intercloud Fabric Director (ICFD) is configured to function as a pure hybrid cloud management platform for use in conjunction with various ICF provider platforms (ICFPP). As discussed below, the novel ICFPPs provided by the subject technology can function as infrastructure gateways to their respective cloud datacenter environments, providing translation logic necessary to convert VM images and resolve infrastructure difference.

Figure 1:
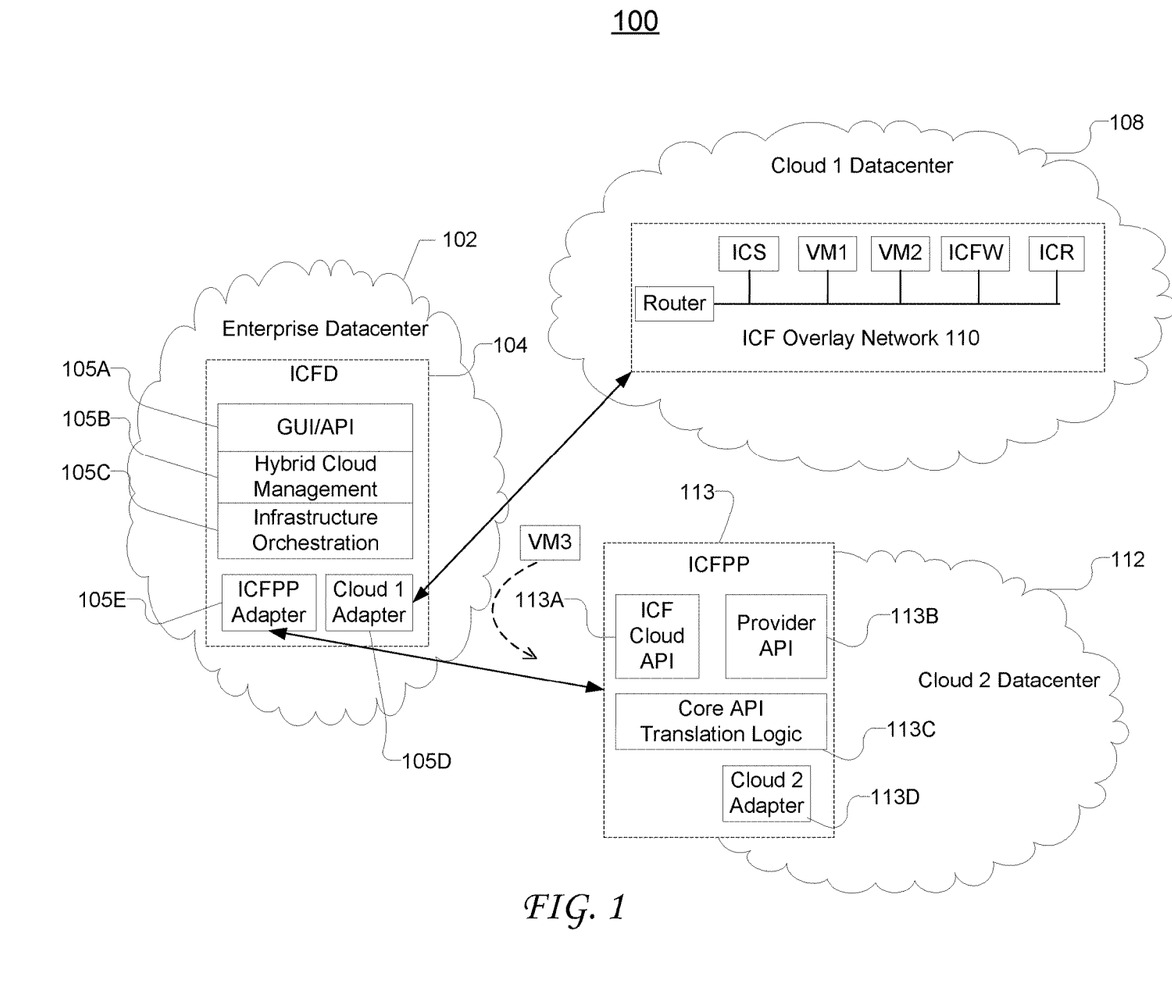
FIG. 1 illustrates an example hybrid cloud infrastructure.

FIG. 1 illustrates an example hub-and-spoke multicloud topology 100, in which cloud-to-enterprise and enterprise-to-cloud migrations are performed. Multicloud topology 100 includes enterprise datacenter 102, and two cloud datacenters: Cloud 1 Datacenter 108, and Cloud 2 Datacenter 112.

Enterprise Datacenter 102 includes applications and logic needed for user control/management over cloud extensions between Enterprise Datacenter 102, Cloud 1 Datacenter 108 and/or Cloud 2 Datacenter 112. Much of this control logic resides in Intercloud Fabric Director (ICFD) 104 that provides a management control platform for ICF system administrators. As such, ICFD 104 can serve as a customer management platform, e.g., on the enterprise side of the network. In some aspects, ICFD 104 can provide role-based end-user and IT administration portals, for example, to provide for a seamless experience in accessing and managing private and public cloud resources.

As illustrated, ICFD 104 includes a management GUI/API 105A, a hybrid cloud management module 105B, an infrastructure orchestration module 105C, an ICFPP adapter 105D, and a cloud adaptor, i.e., Cloud 1 Adapter 105E. Operationally, management GUI/API module 105A is configured to provide various interfaces (e.g., user and programming interfaces) for use by the ICF administrator and/or end user/s to configure and manage the hybrid solution. Hybrid cloud management module 105B functions to provide high level abstractions of how to build a hybrid cloud, and use it to operate various features, such as virtual cloud account abstraction, workload migration, cluster bursting, and/or application level disaster recovery, etc.

In turn, infrastructure orchestration module 105C can be used to provide low-level abstractions of infrastructure orchestrations, such as cloud resources discovery, cloud resource lifecycle management, image format transformation, image transportation, and/or template creation. The VMM/cloud platform infrastructure adapter module 105D can be used to provide a cloud adapter layer, for example, for translating infrastructural orchestration functions into VMM/cloud specific APIs (e.g., vCenter, API, AWS API, OpenStack API, etc.) and submitting API requests to target VMM/cloud API endpoints.

Another component of conventional ICF implementations is the ICF Provider Platform (ICFPP 113), which is typically deployed at the cloud data center, e.g. Cloud 2 Datacenter 112. As provided in the illustrated example of FIG. 1, ICFD 104 interfaces with ICFPP 113 via ICFPP Adapter 105E. ICFPP 112 issues interfaces to the provider's cloud platform that enable the cloud provider to offer various ICF services. The ICFPP 113 typically functions to abstract the complexity of the cloud provider infrastructure and to offer uniformity for cloud resource consumption.

Similar to ICFD 104, ICFPP 113 includes various software modules, including: an ICF Cloud API module 113A, Provider GUI/API module 113B, core API Translation Logic module 113C, and a VMM/Cloud Platform Infrastructure Adapter module, e.g., Cloud 2 Adapter 113D.

ICF Cloud API 113A provides support for a uniform infrastructure of API interfaces (e.g., ICF Open Cloud API), for example, to help reduce ICFD 104 resource consumption. Provider API 113B (e.g., ICFP Provider GUI/API), provides an interface (e.g., for a system administrator) through which ICFPP 113 can be configured and managed. With the assistance of a cloud specific adapter, core API translation logic module 113C provides for API translation between ICF Cloud API 113A and a given cloud environment, such as, Cloud 2 Datacenter 112. In turn, Cloud 2 Adapter 113D (e.g., a VMM/Cloud Platform Infrastructure Adapter) serves to provide a cloud adapter layer, for example, for translating infrastructure orchestration functions into VMM/cloud specific APIs (e.g., vCenter API, AWS API, OpenStack API), and submitting various API requests to targeted VMM/cloud API end-points.

In some aspects, the hub-and-spoke hybrid cloud model exemplified by FIG. 1 is adequate for handling enterprise-to-cloud and cloud-to-enterprise use cases. That is, infrastructure expansions or VM workload migrations can be adequately handled from Enterprise Datacenter 102 to Cloud 1 Datacenter, and vice versa. However, cloud-to-cloud workload migrations, such as a VM workload migration from Cloud 1 Datacenter 108 to Cloud 2 Datacenter 112 are not performed directly, and can therefore burden ICFD 104.

By way of example, an ICF user intending to perform a workload migration, such as migrating VM3 from Cloud 1 Datacenter 108 to Cloud 2 Datacenter 112, would first need to export (transport) a VM image for VM3 from Cloud 1 Datacenter 108 to Enterprise Datacenter 102. Subsequently, based on the image format requirements at the destination cloud (e.g., Cloud 2 Datacenter 112), ICFD 104 would need to transform the image format from the source cloud (i.e., Cloud 1 Datacenter 108) to the proper destination format, i.e., a format for Cloud 2 datacenter 112, such as Qcow2 for the OpenStack based cloud platform. After the VM image transformation is complete, it is transported to the destination cloud datacenter (e.g., Cloud 2 Datacenter), and used to build a VM template for instantiating a new VM instance on the destination datacenter, thus completing transfer of the VM workload associated with VM2 from Cloud 1 Datacenter 108 to Cloud 2 Datacenter 112.

Figure 2A:
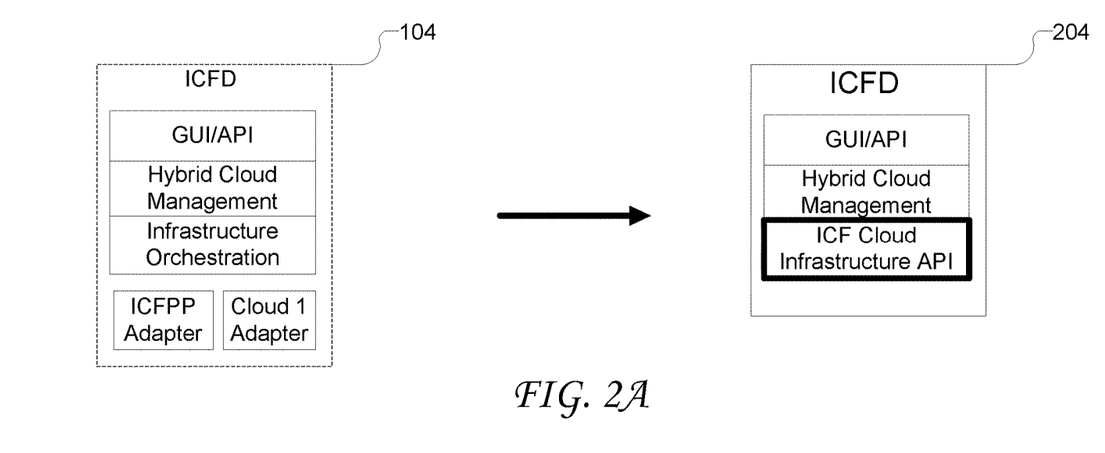
FIGS. 2A and 2B illustrates example modifications to an intercloud fabric director (ICFD) module and intercloud fabric provider platform (ICFPP) module that can be used to facilitate intercloud migration, according to some aspects of the subject technology.
Figure 2B:
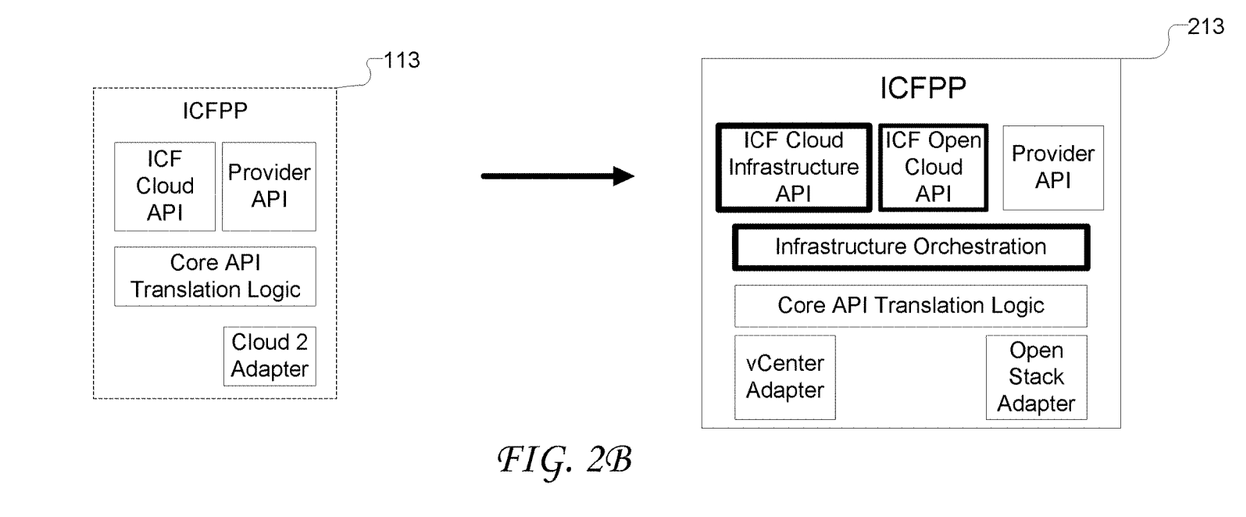

FIGS. 2A and 2B respectively illustrate examples of a novel intercloud fabric director (ICFD) and intercloud fabric provider platform (ICFPP) that can be used to facilitate intercloud migration, according to some aspects of the technology. As illustrated in the example of FIG. 2A, ICFD 104, as discussed with respect to FIG. 1, is modified to create a new ICFD 204 that includes an ICF Cloud Infrastructure API for handling infrastructure level requests at the ICFD. Similarly, in FIG. 2B ICFPP 113 is modified to create new ICFPP 213, which includes an ICF Open Cloud API, an ICF Cloud Infrastructure API, and an Infrastructure Orchestration module.

As discussed in further detail below, integrating an ICF Open Cloud API into the new ICFPP 213 enables direct communication between different ICFPP instances instantiated at different datacenters, thereby enabling direct cloud-to-cloud migrations. Additionally, integration of Infrastructure Orchestration module into the ICFPP provides a solution in which infrastructure processing capacity can be scaled, for example, proportional to the number of ICFPP instances.

By way of example, communication between a first ICFPP instance at a first cloud location can be used to directly communicate with a second ICFPP instance at a second cloud location, e.g., via their respective ICF Open Cloud API modules. In contrast to conventional ICFPP implementations, this direct communication can be performed without the continued involvement of the ICFD. Therefore, in such implementations, the ICFPP instances are permitted to issue infrastructure level requests on behalf of the ICFD instance.

Cloud-to-cloud migrations are further facilitated by an Infrastructure Orchestration module of the ICFPP, which supports translation logic required for image conversation and the resolution of infrastructure differences, for example, between the source cloud and the destination cloud. Typical infrastructural operations of the Infrastructure Orchestration module can include, but are not limited to, image format transformation, image transportation, VM life-cycle management, and/or network/storage service management, etc. Further details relating to cloud-to-cloud transfers using ICFD 204 and ICFPP 213 are discussed in connection with FIG. 3.

Figure 3:
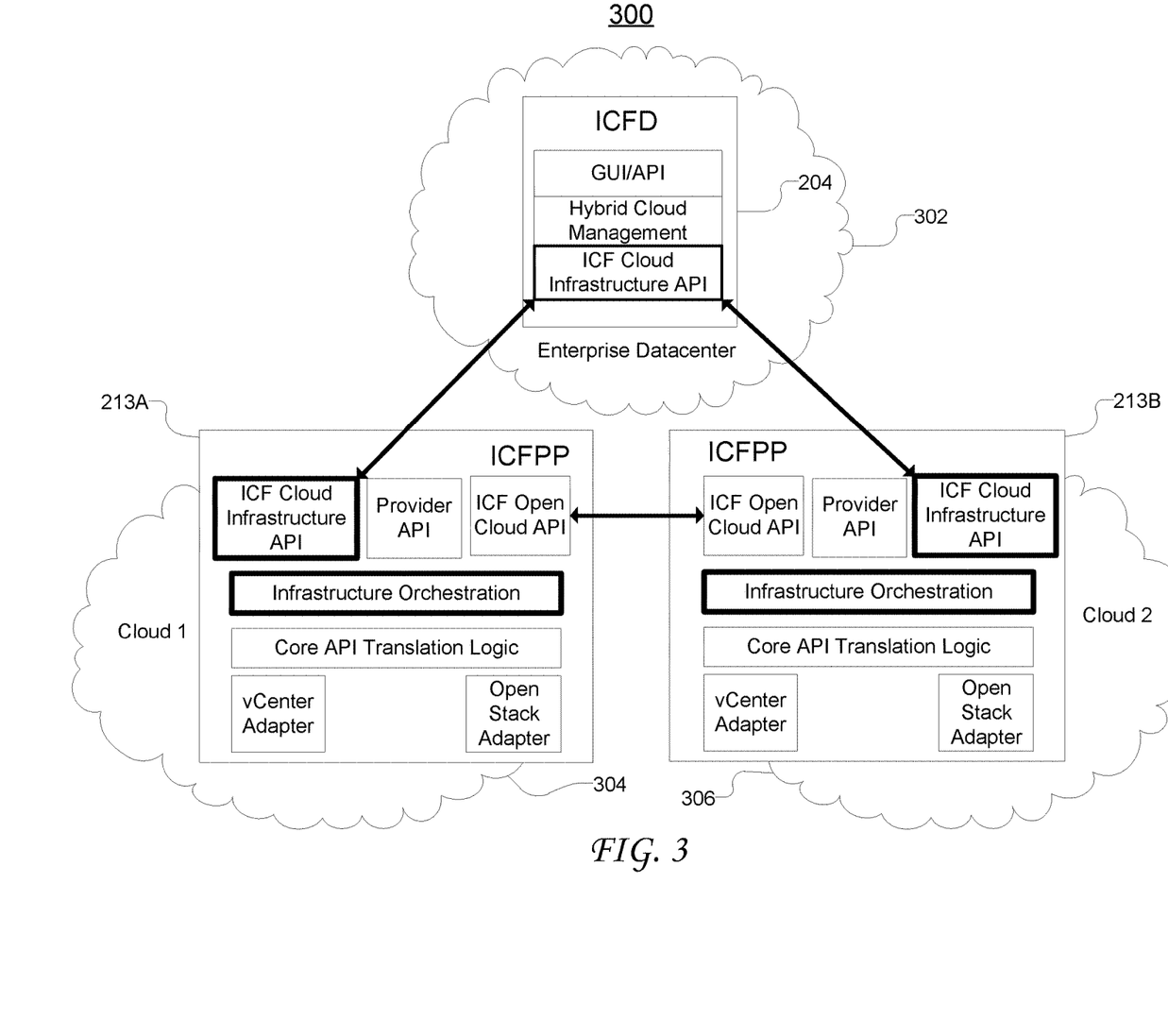
FIG. 3 conceptually illustrates a cloud architecture used to perform an intercloud migration using novel ICFD and ICFPP modules of the subject technology.

In particular, FIG. 3 conceptually illustrates a cloud environment 300 used to perform an intercloud migration using novel ICFD 204 and novel ICFPPs (213A, 213B) of the subject technology.

Cloud environment 300 includes enterprise datacenter 302, a first cloud (e.g., Cloud 1 304), and a second cloud, e.g., Cloud 2 306. Enterprise datacenter 302 includes ICFD 204 that is configured to enable an ICF end user (not illustrated) to orchestrate cloud infrastructure changes, and/or VM workload migrations between Cloud 1 304 and Cloud 2 306. As illustrated, Cloud 1 304 includes ICFPP 213A and Cloud 2 includes ICFPP 213B, each of which are configured to communicate with ICFD 204 via a respective ICF Cloud Infrastructure API. Additionally, ICFPP 213A and 213B are each configured for direct communication via a respective ICF Open Cloud API.

In operation, an ICF user or administrator (not illustrated) of ICFD 204 can perform a VM workload migration, e.g., from Cloud 1 304 to Cloud 2 306, using ICFPP 213A and 213B. To perform the migration, the ICF user would login to ICFPP 213A, using the ICF Cloud Infrastructure API of ICFD 204 to submit a VM migration request to ICFPP 213A. Upon receiving the VM migration request from ICFD 204, ICFPP 213A in Cloud 1 304 would sign-on to ICFPP 213B in Cloud 2 306, for example, through communication between respective ICF Open Cloud API modules. ICFPP 213A would then transport a VM image to ICFPP 213B.

After VM image transportation is complete, using the Infrastructure Orchestration module, ICFPP 213B can transform the image into a local format (e.g., depending on the cloud platform of Cloud 2 306), and use the transformed image to build a VM template. Subsequently, the VM template is used for instantiating a VM instance on Cloud 2 306. In some aspects, once the VM workload is successfully instantiated on Cloud 2 306, ICFPP 213A in Cloud 1 304 can generate and transmit an operational status back to ICFD 204, for example, to indicate completion of the hybrid cloud operation cycle.

Although the examples described in relation to FIG. 3 deal with communication between three datacenters, it is understood that various aspects of the technology can be implemented using a greater number of cloud environments, without departing from the scope of the invention. Additionally, in the illustrated example of cloud environment 300, it is assumed that Cloud 1 304 and Cloud 2 306 are associated with different cloud platforms, however, VM workload migration and/or infrastructure extensions can be performed via ICFPP 213A and 213B in implementations, wherein cloud platforms are homogenous, without departing from the scope of the technology.

Figure 4:
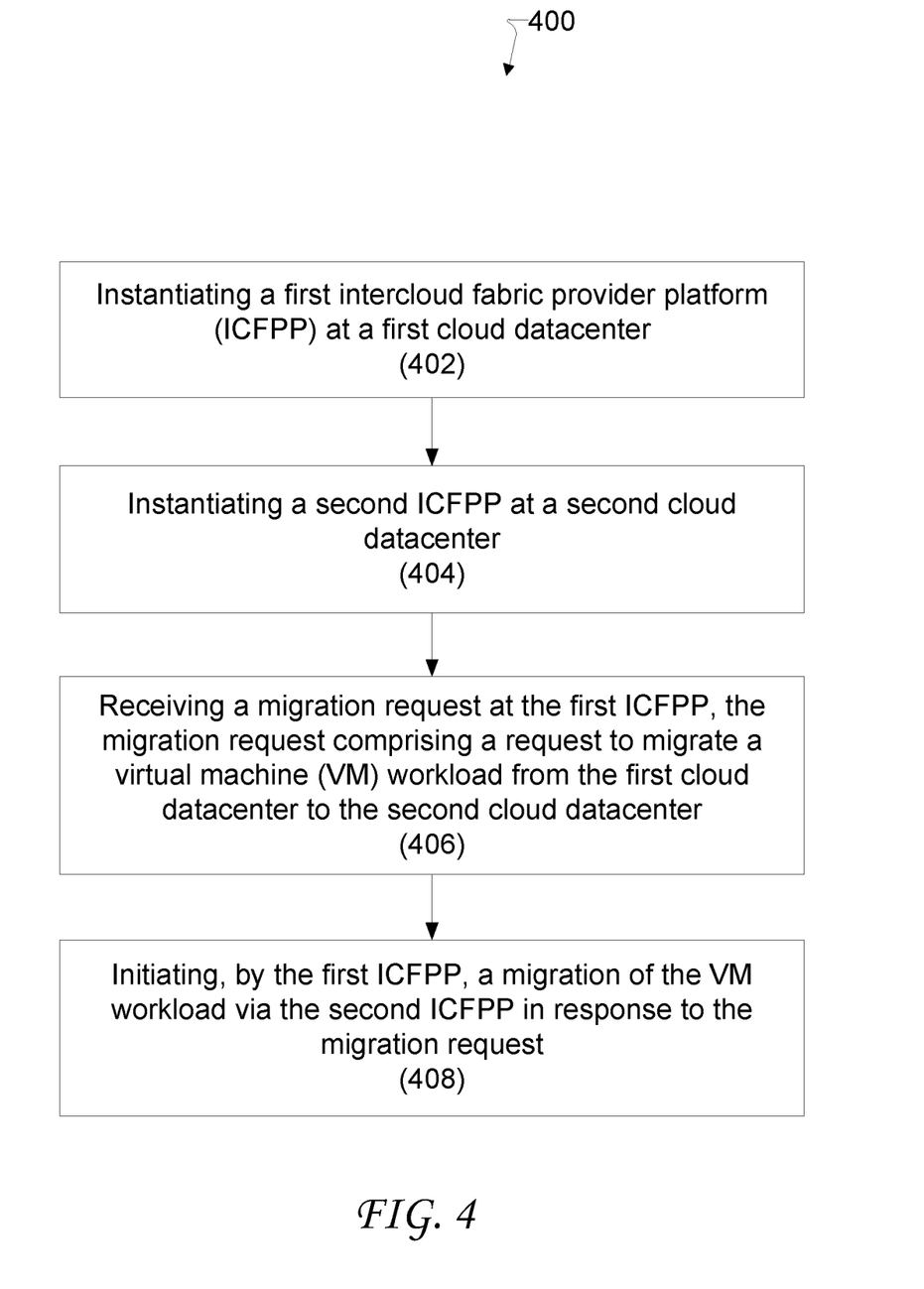
FIG. 4 illustrates a process for implementing an intercloud migration, according to some aspects of the technology.

FIG. 4 illustrates an example process 400 for implementing an intercloud migration technique, according to some aspects. Process 400 begins with step 402 in which a first intercloud fabric provider platform (ICFPP) is instantiated at a first cloud datacenter, such as, ICFPP 213A and Cloud 1 304, discussed above. In step 404, a second ICFPP is instantiated at a second cloud datacenter, such as, ICFPP 213B and Cloud 2 306, discussed above.

Each ICFPP instance contains a respective Infrastructure Orchestration module, as well as an ICF Open Cloud API module, for example, to enable direct communication with other ICF Open Cloud API modules. Additionally, each ICFPP includes an ICF Cloud Infrastructure API module configured for communication with a complementary ICF Cloud Infrastructure API module, for example, located at a datacenter ICFD, such as, ICFD 204, discussed above.

In step 406, a migration request is received at the first ICFPP. The migration request can be issued by an ICF administrator, e.g., from an associated ICFD instantiated on another cloud, such as, a remote enterprise datacenter. Although the foregoing example provides an illustration of a migration request for transporting a VM workload directly between clouds (e.g., from Cloud 1 304 to Cloud 2 306), it is understood that other hybrid use cases are contemplated by the present invention. For example, the ICF end user can use an ICFD at a remote datacenter to extend (or contract) infrastructure between two clouds using the ICFPP communication methods mentioned above.

Subsequently, in step 408, a migration of the VM workload is initiated by the first ICFPP. As discussed above, initiation of the VM workload migration by the first ICFPP can be performed by signing into the second ICFPP in the second cloud datacenter. Once the VM image has been transported to the second cloud datacenter, a resident Infrastructure Orchestration module can perform processing necessary to transform the image into a local format, and use the image to build a new VM template that is specific for the local cloud environment. The newly created VM template can then be used to instantiate the corresponding VM workload, and notification can be provided back to the ICFD indicating that the migration has completed.

By creating an orchestration model in which VMM/cloud platform infrastructure related processing is handled by each ICFPP (as opposed to the ICFD), processing overhead for image transportation can be greatly reduced. Additionally, moving infrastructure related processing (e.g., the Infrastructure Orchestration module) into the ICFPP, provides an effective way to scale ICF deployments, and therefore, for diagnosing infrastructure related problems. In some aspects, the orchestration model provided by the subject technology can also be used to address use cases such as enterprise-to-enterprise and region-to-region (same cloud) migrations.

Example Devices

Figure 5:
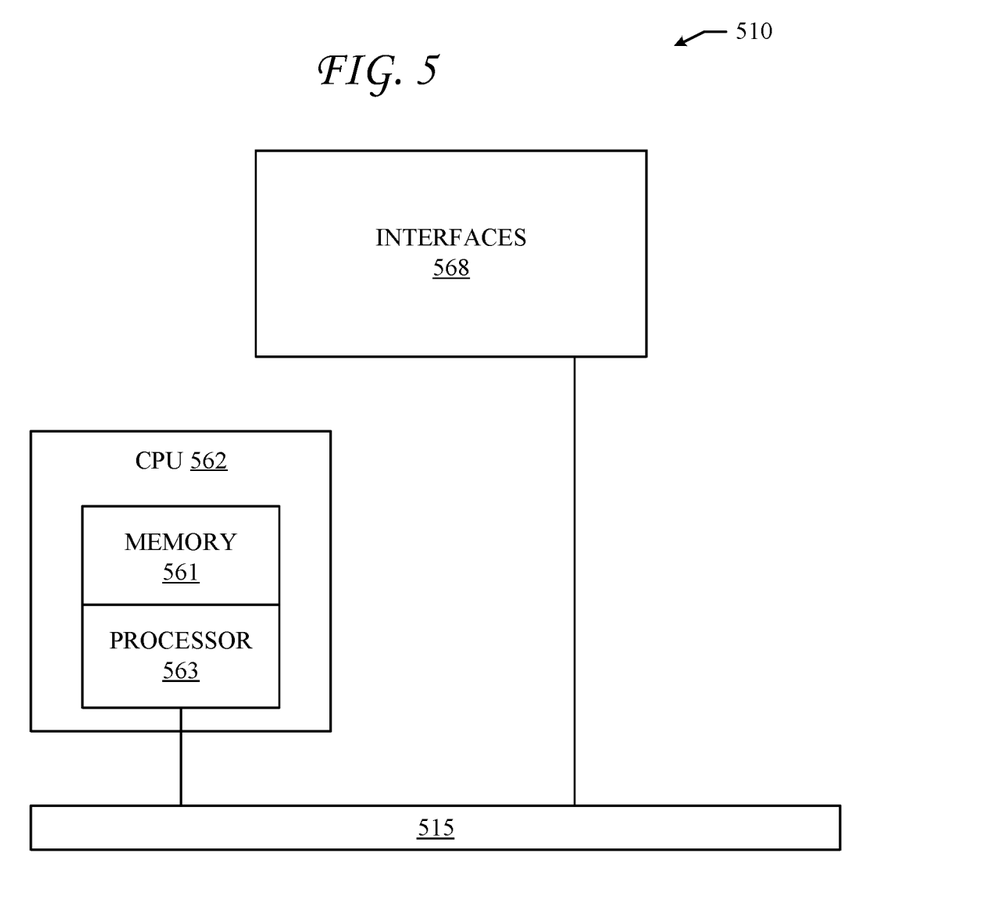
FIG. 5 illustrates an example network device on which aspects of the subject technology can be implemented.

FIG. 5 illustrates an example network device 510 suitable for high availability and failover. Network device 510 includes a master central processing unit (CPU) 562, interfaces 568, and a bus 515 (e.g., a PCI bus). When acting under the control of appropriate software or firmware, the CPU 562 is responsible for executing packet management, error detection, and/or routing functions. The CPU 562 preferably accomplishes all these functions under the control of software including an operating system and any appropriate applications software. CPU 562 may include one or more processors 563 such as a processor from the Motorola family of microprocessors or the MIPS family of microprocessors. In an alternative embodiment, processor 563 is specially designed hardware for controlling the operations of router 510. In a specific embodiment, a memory 561 (such as non-volatile RAM and/or ROM) also forms part of CPU 562. However, there are many different ways in which memory could be coupled to the system.

The interfaces 568 are typically provided as interface cards (sometimes referred to as "line cards"). Generally, they control the sending and receiving of data packets over the network and sometimes support other peripherals used with the router 510. Among the interfaces that may be provided are Ethernet interfaces, frame relay interfaces, cable interfaces, DSL interfaces, token ring interfaces, and the like. In addition, various very high-speed interfaces may be provided such as fast token ring interfaces, wireless interfaces, Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management. By providing separate processors for the communications intensive tasks, these interfaces allow the master microprocessor 562 to efficiently perform routing computations, network diagnostics, security functions, etc.

Although the system shown in FIG. 5 is one specific network device of the present invention, it is by no means the only network device architecture on which the present invention can be implemented. For example, an architecture having a single processor that handles communications as well as routing computations, etc. is often used. Further, other types of interfaces and media could also be used with the router.

Regardless of the network device's configuration, it may employ one or more memories or memory modules (including memory 561) configured to store program instructions for the general-purpose network operations and mechanisms for roaming, route optimization and routing functions described herein. The program instructions may control the operation of an operating system and/or one or more applications, for example. The memory or memories may also be configured to store tables such as mobility binding, registration, and association tables, etc.

Figure 6A:
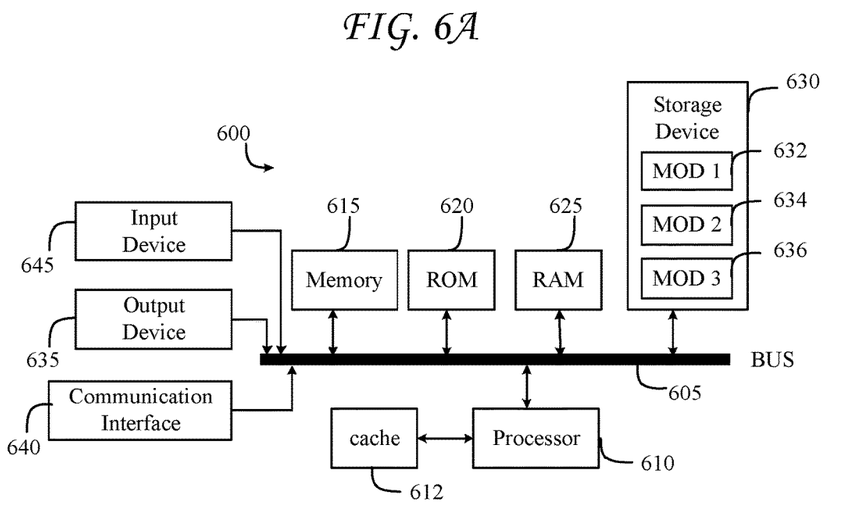
FIGS. 6A and 6B illustrate examples of processor-based systems.
Figure 6B:
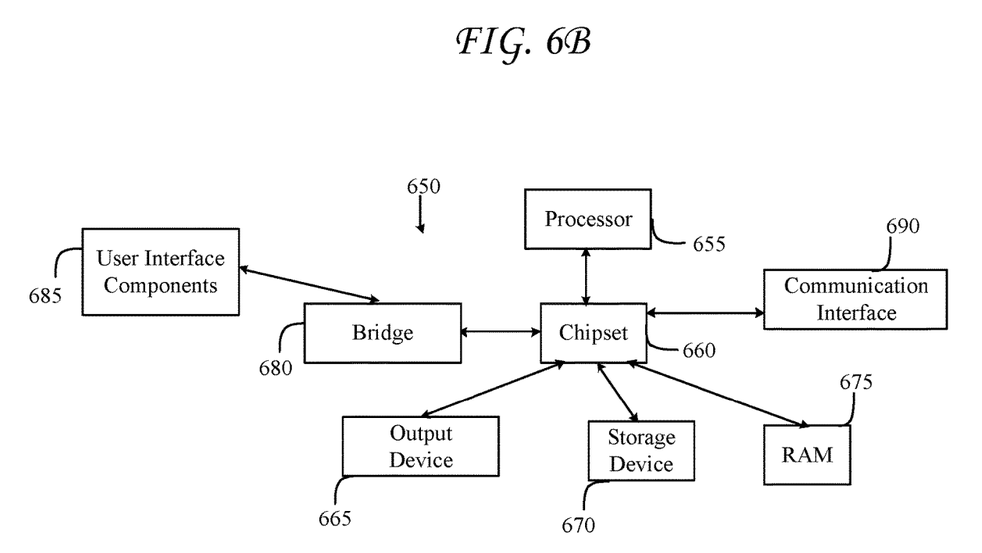

FIG. 6A and FIG. 6B illustrate example system embodiments. The more appropriate embodiment will be apparent to those of ordinary skill in the art when practicing the present technology. Persons of ordinary skill in the art will also readily appreciate that other system embodiments are possible.

FIG. 6A illustrates a conventional system bus computing system architecture 600 wherein the components of the system are in electrical communication with each other using a bus 605. Exemplary system 600 includes a processing unit (CPU or processor) 610 and a system bus 605 that couples various system components including the system memory 615, such as read only memory (ROM) 620 and random access memory (RAM) 625, to the processor 610. The system 600 can include a cache of high-speed memory connected directly with, in close proximity to, or integrated as part of the processor 610. The system 600 can copy data from the memory 615 and/or the storage device 630 to the cache 612 for quick access by the processor 610. In this way, the cache can provide a performance boost that avoids processor 610 delays while waiting for data. These and other modules can control or be configured to control the processor 610 to perform various actions. Other system memory 615 may be available for use as well. The memory 615 can include multiple different types of memory with different performance characteristics. The processor 610 can include any general purpose processor and a hardware module or software module, such as module 1 632, module 2 634, and module 3 636 stored in storage device 630, configured to control the processor 610 as well as a special-purpose processor where software instructions are incorporated into the actual processor design. The processor 610 may essentially be a completely self-contained computing system, containing multiple cores or processors, a bus, memory controller, cache, etc. A multi-core processor may be symmetric or asymmetric.

To enable user interaction with the computing device 600, an input device 645 can represent any number of input mechanisms, such as a microphone for speech, a touch-sensitive screen for gesture or graphical input, keyboard, mouse, motion input, speech and so forth. An output device 635 can also be one or more of a number of output mechanisms known to those of skill in the art. In some instances, multimodal systems can enable a user to provide multiple types of input to communicate with the computing device 600. The communications interface 640 can generally govern and manage the user input and system output. There is no restriction on operating on any particular hardware arrangement and therefore the basic features here may easily be substituted for improved hardware or firmware arrangements as they are developed.

Storage device 630 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 625, read only memory (ROM) 620, and hybrids thereof.

The storage device 630 can include software modules 632, 634, 636 for controlling the processor 610. Other hardware or software modules are contemplated. The storage device 630 can be connected to the system bus 605. In one aspect, a hardware module that performs a particular function can include the software component stored in a computer-readable medium in connection with the necessary hardware components, such as the processor 610, bus 605, display 635, and so forth, to carry out the function.

FIG. 6B illustrates an example computer system 650 having a chipset architecture that can be used in executing the described method and generating and displaying a graphical user interface (GUI). Computer system 650 is an example of computer hardware, software, and firmware that can be used to implement the disclosed technology. System 650 can include a processor 655, representative of any number of physically and/or logically distinct resources capable of executing software, firmware, and hardware configured to perform identified computations. Processor 655 can communicate with a chipset 660 that can control input to and output from processor 655. In this example, chipset 660 outputs information to output device 665, such as a display, and can read and write information to storage device 670, which can include magnetic media, and solid state media, for example. Chipset 660 can also read data from and write data to RAM 675. A bridge 680 for interfacing with a variety of user interface components 685 can be provided for interfacing with chipset 660. Such user interface components 685 can include a keyboard, a microphone, touch detection and processing circuitry, a pointing device, such as a mouse, and so on. In general, inputs to system 650 can come from any of a variety of sources, machine generated and/or human generated.

Chipset 660 can also interface with one or more communication interfaces 690 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 655 analyzing data stored in storage 670 or 675. Further, the machine can receive inputs from a user via user interface components 685 and execute appropriate functions, such as browsing functions by interpreting these inputs using processor 655.

It can be appreciated that example systems 600 and 650 can have more than one processor 610 or be part of a group or cluster of computing devices networked together to provide greater processing capability.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims. Moreover, claim language reciting "at least one of" a set indicates that one member of the set or multiple members of the set satisfy the claim.

What is claimed is:

1. A method for facilitating intercloud resource migration, the method comprising:
   instantiating a first intercloud fabric provider platform (ICFPP) at a first cloud datacenter;
   instantiating a second ICFPP at a second cloud datacenter;
   receiving a migration request at the first ICFPP, the migration request originating from an intercloud fabric director (ICFD), the migration request comprising a request to migrate a virtual machine (VM) workload from the first cloud datacenter to the second cloud datacenter; and
   initiating, by the first ICFPP, a migration of the VM workload via the second ICFPP in response to the migration request, the migration initiated by the first ICFPP signing on to the second ICFPP.

2. The method of claim 1,
   wherein,
   the signing on to the second ICFPP by the first ICFPP is performed at the second cloud datacenter, and
   the initiating of the migration of the VM workload includes transporting, by the first ICFPP, a VM image from the first cloud datacenter to the second cloud datacenter, the VM image corresponding with the requested VM workload.

3. The method of claim 2, wherein the initiating of the migration of the VM workload further comprises:
   transforming, by the second ICFPP, the VM image to produce a transformed VM image, the transformed VM image corresponding with a local format of the second cloud datacenter; and
   building a VM template based on the transformed VM image.

4. The method of claim 3, further comprising:
   instantiating, by the second ICFPP, a second VM instance on the second cloud datacenter using VM template.

5. The method of claim 4, further comprising:
   determining, by the first ICFPP, if the VM workload has been successfully instantiated on the second cloud datacenter; and
   generating, by the first ICFPP, an operational status indicator in response to a successful instantiation of the VM workload on the second cloud datacenter.

6. The method of claim 1, wherein the ICFD is instantiated on one or more network systems outside the first cloud datacenter and the second cloud datacenter.

7. The method of claim 1,
   wherein,
   the first ICFPP comprises a first cloud application programming interface (API),
   the second ICFPP comprises a second cloud API, and
   the first ICFPP and second ICFPP are configured for direct communication via the first cloud API and the second cloud API.

8. A system for facilitating intercloud resource migration, the system comprising:
   one or more processors;
   a network interface coupled to the one or more processors, the network interface configured for exchanging data packets with one or more computer networks; and
   a computer-readable medium coupled to the one or more processors and comprising instructions stored therein, which when executed by the processors, cause the processors to perform operations comprising:

instantiating a first intercloud fabric provider platform (ICFPP) at a first cloud datacenter;

instantiating a second ICFPP at a second cloud datacenter;

receiving a migration request at the first ICFPP, the migration request originating from an intercloud fabric director (ICFD), the migration request comprising a request to migrate a virtual machine (VM) workload from the first cloud datacenter to the second cloud datacenter; and initiating, by the first ICFPP, a migration of the VM workload via the second ICFPP in response to the migration request, the migration initiated by the first ICFPP signing on to the second ICFPP.

9. The system of claim 8, wherein, the signing on to the second ICFPP by the first ICFPP is performed at the second cloud datacenter, and the initiating of the migration of the VM workload includes transporting, by the first ICFPP, a VM image from the first cloud datacenter to the second cloud datacenter, wherein the VM image corresponds with the requested VM workload.

10. The system of claim 9, wherein the initiating of the migration of the VM workload further comprises:

transforming, by the second ICFPP, the VM image to produce a transformed VM image, the transformed VM image corresponding with a local format of the second cloud datacenter; and building a VM template based on the transformed VM image.

11. The system of claim 10, further comprising:

instantiating, by the second ICFPP, a second VM instance on the second cloud datacenter using VM template.

12. The system of claim 11, further comprising:

determining, by the first ICFPP, if the VM workload has been successfully instantiated on the second cloud datacenter; and generating, by the first ICFPP, an operational status indicator in response to a successful instantiation of the VM workload on the second cloud datacenter.

13. The system of claim 8, wherein the ICFD is instantiated on one or more network systems outside the first cloud datacenter and the second cloud datacenter.

14. The system of claim 8, wherein, the first ICFPP comprises a first cloud application programming interface (API), the second ICFPP comprises a second cloud API, and the first ICFPP and second ICFPP are configured for direct communication via the first cloud API and the second cloud API.

15. A non-transitory computer-readable storage medium comprising instructions stored therein, which when executed by one or more processors, cause the processors to perform operations comprising:

instantiating a first intercloud fabric provider platform (ICFPP) at a first cloud datacenter;

instantiating a second ICFPP at a second cloud datacenter;

receiving a migration request at the first ICFPP, the migration request originating from an intercloud fabric director (ICFD), the migration request comprising a request to migrate a virtual machine (VM) workload from the first cloud datacenter to the second cloud datacenter; and initiating, by the first ICFPP, a migration of the VM workload via the second ICFPP in response to the migration request, the migration initiated by the first ICFPP signing on to the second ICFPP.

16. The non-transitory computer-readable storage medium of claim 15, wherein, the signing on to the second ICFPP by the first ICFPP is performed at the second cloud datacenter, and the initiating of the migration of the VM workload includes transporting, by the first ICFPP, a VM image from the first cloud datacenter to the second cloud datacenter, wherein the VM image corresponds with the requested VM workload.

17. The non-transitory computer-readable storage medium of claim 16, wherein the initiating of the migration of the VM workload further comprises:

transforming, by the second ICFPP, the VM image to produce a transformed VM image, the transformed VM image corresponding with a local format of the second cloud datacenter; and building a VM template based on the transformed VM image.

18. The non-transitory computer-readable storage medium of claim 17, further comprising:

instantiating, by the second ICFPP, a second VM instance on the second cloud datacenter using VM template.

19. The non-transitory computer-readable storage medium of claim 18, further comprising:

determining, by the first ICFPP, if the VM workload has been successfully instantiated on the second cloud datacenter; and generating, by the first ICFPP, an operational status indicator in response to a successful instantiation of the VM workload on the second cloud datacenter.

20. The non-transitory computer-readable storage medium of claim 15, wherein the ICFD is instantiated on one or more network systems outside the first cloud datacenter and the second cloud datacenter.

* * * * *